United States Patent [19]

Carino

[11] Patent Number: 4,802,063
[45] Date of Patent: Jan. 31, 1989

[54] CAPACITOR ASSEMBLY WITH ANCHORING MEANS FOR A LAYERED CAPACITOR

[75] Inventor: John W. Carino, Columbia, S.C.

[73] Assignee: North American Philips Corporation, New York, N.Y.

[21] Appl. No.: 123,446

[22] Filed: Nov. 19, 1987

[51] Int. Cl.$^4$ .............................................. H01G 9/06
[52] U.S. Cl. .................................................. 361/433
[58] Field of Search ...................... 361/433 W, 433 H

[56] References Cited

U.S. PATENT DOCUMENTS

| | | | |
|---|---|---|---|
| 3,551,756 | 12/1970 | Frekko | 361/433 H |
| 3,956,677 | 5/1976 | Quick | 317/260 |
| 4,208,699 | 6/1980 | Philpott et al. | 361/433 H |
| 4,342,070 | 7/1982 | Evans | 361/433 H |

FOREIGN PATENT DOCUMENTS 1154573 9/1963 Fed. Rep. of Germany ...... 361/433 W

Primary Examiner—Donald A. Griffin
Attorney, Agent, or Firm—Robert J. Kraus

[57] ABSTRACT

A capacitor assembly having a spiral-wound, layered capacitor secured against movement in a cylindrical container. The capacitor is secured in the container between a closed end of the container and a lid closing an open end of the container, each having distributed projections which press into a respective end of the capacitor. The projections in the lid extend radially from the center of the lid and have a principal effect of minimizing rotational movement of the capacitor. The projections in the container bottom are in the form of raised solid bumps arranged in a circular pattern and have a principal effect of minimizing lateral movement of the capacitor.

8 Claims, 3 Drawing Sheets

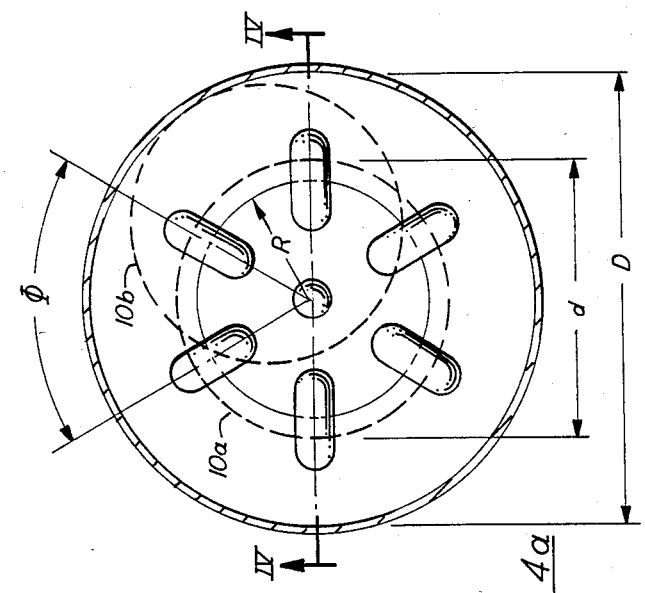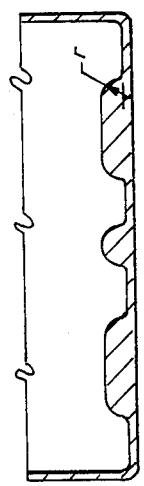
FIG.4a FIG.4b
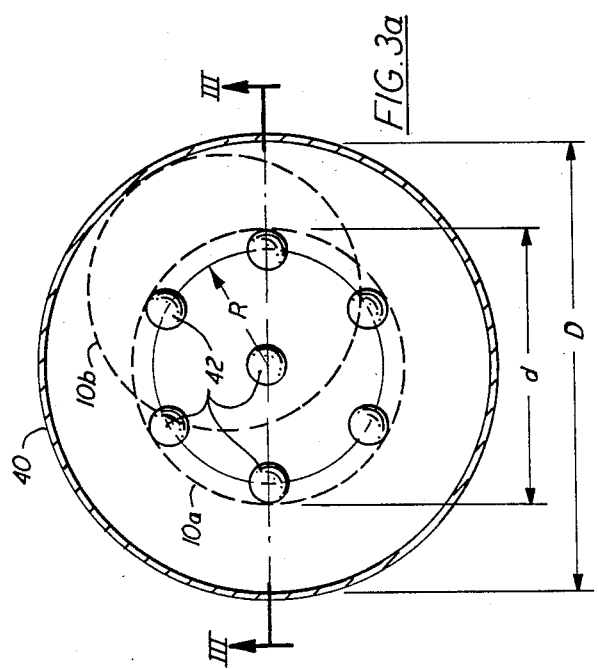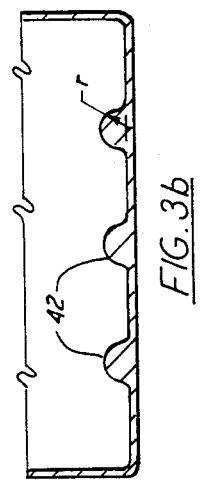
FIG.3a FIG.3b

CAPACITOR ASSEMBLY WITH ANCHORING MEANS FOR A LAYERED CAPACITOR

BACKGROUND OF THE INVENTION

1. Field of the Invention

The invention relates to a capacitor assembly having a layered capacitor housed in a container, and in particular to means for securing the capacitor in the container.

2. Description of the Prior Art

Capacitor assemblies of the above-described type are typically produced by wrapping alternating conductive and insulative layers around a form, such as a mandrel, and securing the resulting wound capacitor in a protective housing. Ordinarily, the housing is a cylinder which is closed at one end and open at the opposite end. After insertion of a capacitor the open end is sealed by installing a lid.

The capacitor must be secured such that vibration will not cause it to move within the container. Such movement could damage the capacitor by electrically shorting the conductive layers. One means for securing such a layered capacitor within a container is described in U.S. Pat. No. 4,486,809, which is hereby incorporated by reference. In the capacitor assembly described, special cup-shaped members are added to the assembly to anchor the capacitor within the container. Each of these cup-shaped members includes an integral central spike for attaching the member to a respective end of the capacitor. Attachment is achieved by inserting the spikes into opposite ends of a hollow core member around which the capacitor layers are wrapped, thereby centering and holding the capacitor in place.

Such added members are not desirable, because they increase the assembly and material costs of the finished capacitor assembly and occupy valuable space within the container. Such space could otherwise be used to increase the size, and thus the capacitance, of the capacitor. In electrolytic capacitors the space is also needed to allow for the expansion of gases which may be generated during operation.

U.S. Pat. No. 4,245,277, which is hereby incorporated by reference, discloses a capacitor assembly in which a wound capacitor is secured in a cylindrical container between a closed end and a lid installed on an open end. The capacitor is centered and supported within the container by means of a hollow core member, around which the capacitor layers are wrapped, and by first and second centering members projecting into opposite ends of the hollow core member. The first centering member is a cylindrical member extending from the lid, and the second centering member is a truncated cone-shaped member integrally formed in the closed end of the container. The first centering member fits closely within one end of the core member, while the second centering member partially projects into the opposite end of the core member.

This arrangement eliminates the need for the cup-shaped members disclosed in the above-mentioned U.S. Pat. No. 4,486,809, but it still requires the added hollow core member. Also, the truncated cone-shaped member causes wasted space, because contact of the hollow core member with the sloped sides of the cone-shaped member keeps the capacitor spaced from the closed end of the container.

FIG. 1 illustrates another prior art capacitor assembly in which a wound capacitor 10 having a hollow center 11 is secured in a cylindrical container 12, without the use of a central core member. Rather, the capacitor itself is secured between an anchor 14, which is inserted in a closed end of the container, and a molded insulative lid 16, which is attached to an open end of the container. The anchor includes a conical spike 18 and three radially-extending legs 20 for centering the spike in the closed end of the container. The inner side of the lid has a plurality of integrally-molded members including a conical spike 22 and three radially-extending ribs 24. The lid also includes terminals 26 and 28 which are electrically connected to conductive layers of the capacitor by means of respective conductive strips 30 and 32.

In the capacitor's assembled state, the capacitor 10 is compressed between the ribs 24 and the conical spike 18 to secure it in place. The ribs 24 press directly into the edge of the layers at the upper end of the capacitor while the sloped surface of the conical spike 18 presses against the edge of the hollow center 11 at the bottom end of the capacitor. Conical spike 22, projecting from the lid, fits loosely within the upper end of the hollow center and serves only as a means for approximately centering the upper end of the capacitor as the lid is installed onto the container.

The arrangement of parts illustrated in FIG. 1 eliminates the need for the central core member utilized in the above-mentioned patents, but it still requires the added anchor part 14. Consequently, the arrangement suffers from the added assembly and material costs resulting from use of the added anchor part. The arrangement also wastes space in the container because, as in the capacitor assembly disclosed in U.S. Pat. No. 4,245,277, the conical spike 18 tends to keep the capacitor spaced from the closed end of the container.

Even more significant is a problem which has been discovered during vibration testing of the FIG. 1 capacitor assembly. Because the capacitor is relatively soft in comparison to the conical spike 18, during vibration the spike tends to deform the innermost layers of the capacitor and enlarge the area of the hollow center 11 adjacent the spike. This enlargement reduces the compressive holding force applied by the ribs 24, and allows a reciprocatory rubbing motion of the capacitor against the spike and the ribs. This rubbing motion can wear through multiple layers of the capacitor and effect shorting together of conductive layers normally separated by interposed insulative layers. This reduction in compressive holding force is accentuated if the capacitor is of a type which generates significant internal gas pressure during operation. Such gas pressure can cause the closed bottom of the container to deform outwardly, with the maximum deformation occurring at the center of the bottom. This deformation will force the conical spike 18 away from the lid 16 and allow an even greater amplitude of movement of the capacitor during vibration.

U.S. Pat. No. 3,509,427 discloses an early capacitor assembly which avoided many of the above-described disadvantages. The early capacitor assembly comprises a cylindrical container with a closed bottom end, a wound capacitor inserted in the container, a lid closing a top end of the container, and electrical leads passing through the lid and into the capacitor layers. The capacitor is secured in position by longitudinally-extending indentations formed in the side of the container. These indentations are equidistantly spaced around the circumference of the container for centering the capacitor.

This capacitor assembly is simple, but wastes space. The capacitor must be made with a sufficiently large diameter to contact the indentations, even if only a smaller diameter is needed to obtain the capacitance desired. Thus any additional space for internal gas expansion which is obtained by avoiding the use of added capacitor-securing elements is sacrificed by increasing the diameter of the capacitor.

SUMMARY OF THE INVENTION

It is an object of the invention to provide a simple capacitor assembly in which a capacitor is secured in a container by means which do not significantly increase the manufacturing or material costs of the assembly.

It is another object of the invention to provide such a capacitor assembly which has a minimum of parts and efficiently utilizes space within the container.

It is yet another object of the invention to provide such a capacitor assembly in which the ability of the securing means to hold the capacitor in place is not negated by internal pressure increases or by misalignment of the capacitor and the securing means.

In accordance with the invention, these and other objects are achieved by securing the capacitor in place in a tubular container between oppositely disposed distributions of pressure-applying projections. These projections are formed in a closed end of the tubular container and in a lid which closes an open end of the container. Preferably, the projections in the closed end of the container are in the form of bumps raising from the inner surface of the container end, and the projections in the lid are in the form of elongated members extending radially from a central region of the lid.

The pressure-applying projections in the container and in the lid can be formed during manufacture of these parts, and no additional capacitor-securing parts or assembly steps are necessary. Because the pressure-applying projections in the ends of the container are distributed, the capacitor is securely held in place despite outward deformation of either end of the container during operation of the capacitor. The projections secure the capacitor in a number of places rather than at a single place in the center where deformation of the container end is maximized. Further, the projections in the closed end of the container can be distributed in a predefined pattern which locates the projections such that at least one of them will press into the respective end of the capacitor at the maximum possible lateral displacement of the capacitor end from a centered portion. Such a pattern will inhibit lateral shifting of a capacitor which is not properly centered during installation, while the radially-extending members in the lid will inhibit rotation of the capacitor.

In addition to accomplishing all of the above-mentioned objects, the invention has the advantage that the distribution of projections can be patterned to secure a variety of capacitor configurations. In particular, the projections in the container end can be distributed in a pattern which is most likely to maximize the number of capacitor-contact points for any particular capacitor end shape and area. For example, a distribution of projections arranged in one or more circular designs surrounding a central projection is well suited for circularly wound capacitors, while other patterns might be better suited for other capacitor configurations. Alternatively, a matrix or radial pattern might be more likely to maximize the number of contact points for a rectangularly-wound capacitor or for a capacitor formed from a rectangular stack of layers. The projections in the lid also may be distributed in patterns other than the aforementioned radial pattern, but this pattern is universally adaptable to different capacitor shapes.

The shapes of the projections may also be adapted to the capacitor shape. For example, spherically-shaped projections are universally adaptable and maximize pressure at their points of contact with the capacitor. Conversely, elongated projections develop less pressure because they tend to distribute the force applied thereby to the capacitor, but have the advantage of extending over a larger area of the container end and increasing the likelihood of making contact with an improperly-positioned capacitor.

BRIEF DESCRIPTION OF THE DRAWING

FIG. 3a is a top view of a cylindrical capacitor container constructed in accordance with one embodiment of the invention.

FIG. 3b is a cross-sectional view of a bottom portion of the container shown in FIG. 3a, taken along the line III—III.

FIG. 4a is a top view of a cylindrical capacitor container constructed in accordance with another embodiment of the invention.

FIG. 4b is a cross-sectional view of a bottom portion of the container shown in FIG. 4a, taken along the line IV—IV.

DESCRIPTION OF THE PREFERRED EMBODIMENT

Figure 1:
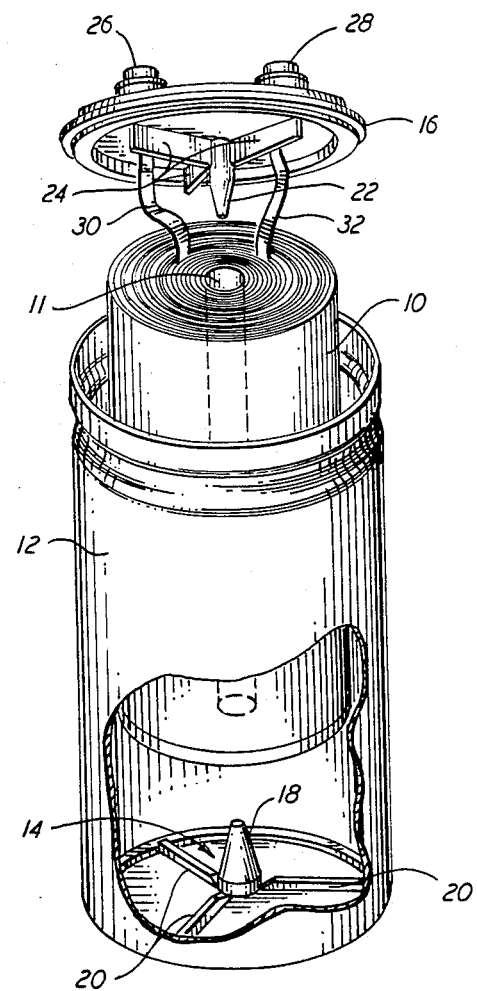
FIG. 1 is an exploded, partially-cut-away view of a prior art capacitor assembly.
Figure 2:
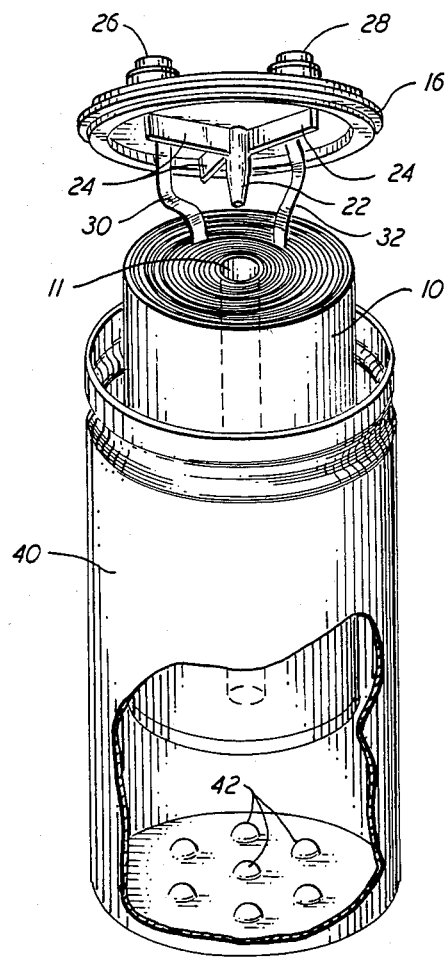
FIG. 2 is an exploded, partially-cut-away view of one embodiment of a capacitor assembly constructed in accordance with the invention.

The first preferred embodiment of the invention, illustrated in FIG. 2, has elements in common with the prior art capacitor assembly illustrated in FIG. 1, and these common elements are labelled with identical numbers to simplify comparison. The common elements include the wound capacitor 10 with the hollow center 11, the molded insulator lid 16 with the conical spike 22 and ribs 24, and the electrical terminals 26, 28 and the conductive strips 30, 32.

In the preferred embodiment, the lid is not modified from that shown in FIG. 1 for two reasons. First, the lid shown is an inexpensive and readily available component which is made in large quantities by a single manufacturer for a number of suppliers of capacitor assemblies. Second, the lid's radially-extending ribs are arranged in a pattern which can be put to advantageous use in accordance with the invention by providing in the bottom of a container for the capacitor a pattern of projections which complements the radial pattern of ribs in the lid. These projections are arranged such that they cooperate with the ribs to apply a distributed compressive force to opposite ends of the capacitor.

In the first preferred embodiment, the distributed compressive force is achieved by providing in the bottom of a cylindrical container a plurality of solid spherical projections distributed in a generally circular pattern. FIG. 2 illustrates such a container 40 having solid spherical projections 42. This type of container can be made by a conventional impact extrusion process by utilizing a punch having indentations corresponding to the solid spherical projections and a die with a flat bottom, which cooperate to shape the container bottom.

The thickness of the resulting container bottom should be sufficient to resist substantial deformation caused by internal pressure increases during operation of the finished capacitor. It has been found that, for a given bottom thickness, this resistance to deformation is greater for the bottom with the projections than for a flat-bottomed container. This additional advantage results from sectional rigidity provided by the projections.

FIGS. 3a and 3b illustrate the pattern, shape and dimensions of the projections in the first preferred embodiment. As can be seen from FIG. 3a, which is a top view of the cylindrical container 40 having the solid spherical projections 42, the pattern includes a centered projection, and six surrounding projections which are equidistantly spaced along a circle having a radius R. This pattern is both conveniently formed and optimizes distribution of the projections on the bottom of the container. Ideally the projections should be positioned such that, for a capacitor having a known diameter, all of the projections press into the bottom of the capacitor when it is centered in the container, and such that at least three projections press into the bottom of the capacitor when it is mis-positioned to its maximum off-center position. These two conditions are illustrated in FIG. 3a by the two dashed circles designated 10a and 10b which represent the centered and maximally mis-positioned locations, respectively, of a capacitor having a diameter d slightly larger than 2R.

The spherical shape of the projections is ideal in the respect that it uniformly resists lateral displacement of the capacitor bottom in all directions. The shape and radius r of these spherical projections are shown in FIG. 3b which is the cross-sectional view of the container bottom taken along the line III—III.

In the first preferred embodiment, typical containers are pressed from aluminum and have, respectively, wall thicknesses of 0.020 t 0.025 inch, bottom thicknesses of 0.035 to 0.050 inch, inside diameters D of 1.335 to 2.947 inches, projection-positioning circle radii R of 0.375 to 0.750 inch, and projection radii r of 0.125 to 0.218 inch. Such a container is utilized for capacitors having nominal diameters d up to the maximum diameter which will fit within the container and having a minimum central core diameter of 0.250 inch.

The height of the container relative to the length of the capacitor is determined such that the ribs in the lid and the projections in the container bottom press into the opposite ends of the capacitor to depths sufficient to secure the capacitor. The height of the container establishes a distance between the tips of the ribs in the lid and the tips of the projections in the container bottom which is smaller than the length of the capacitor by a difference equivalent to the sum of the above-mentioned depths. This difference should increase with both the height and the inside diameter D of the container, in accordance with the mass of the largest capacitor which fits within the container. In the first preferred embodiment a difference of 0.105 inch was provided for containers having an inside diameter D=1.335 and lengths ranging from 2.25 to 5.75 inches; a difference of 0.308 inch was provided for containers having an inside diameter D=2.950 and lengths ranging from 3.30 to 5.80 inches. The above differences are sufficient to secure extended-foil capacitors, but should be increased for types of capacitors having less rigid bottom material where the projections press into the capacitor.

The container may alternatively be molded from an insulative plastic, such as phenolic. However, a container pressed from a conductor such as aluminum has certain advantages not shared by insulative plastic containers. For example, if capacitors having extended-foil cathodes are secured in the container by the projections, the multiple contacts made by the projections improve both electrical and thermal contact to the foil, thereby decreasing the effective series resistance (ESR) and increasing heat dissipation.

FIGS. 4a and 4b illustrate the pattern, shape and dimensions of the projections in the second preferred embodiment. The primary difference between this embodiment and the first embodiment is the shape and dimensions of the projections themselves. Rather than having spherical projections, this embodiment has elongated projections each extending radially, with adjacent projections lying along radii spaced-apart by an arc length $\phi$. Again the projections are positioned such that, for a capacitor having a known diameter d, all of the projections press into the bottom of the capacitor when it is centered in the container at position 10a, and such that portions of at least three projections press into the bottom of the capacitor when it is mis-positioned to its maximum off-centered position 10b.

The elongated projections offer resistance to lateral displacement of the capacitor bottom which could be larger or smaller than that for the spherical projections, depending on the position of the capacitor bottom. However, the elongated projections produce a more rigid container bottom, and contact a larger surface area of the capacitor than the spherical projections, thus making better electrical and thermal contact with capacitors having extended-foil cathodes. In the second preferred embodiment, a typical container has dimensions similar to those for the first preferred embodiment. In either embodiment it is contemplated that the projections in the container may take alternative forms, such as hollow indentations impressed into the end of the container.

I claim:

1. A capacitor assembly comprising a tubular container having a closed end and an open end, a wound capacitor having alternating conductive and insulative layers disposed in the container, and a lid for closing the open end of the container, characterized in that:
   (a) the closed end of the tubular container includes an inner surface having a first plurality of projections distributed over said surface in a predefined pattern which locates the projections such that at least one of said projections will press into a first end of the capacitor at the maximum possible displacement of the first end from a centered position in the container, said predefined pattern including at least one circular arrangement of said projections surrounding a central region of the closed end of the container; and
   (b) the lid includes an inner surface having a second plurality of distributed projections comprising elongated members extending radially from a central region of the lid for pressing against a second end of the capacitor;
   the distance between the first and second ends of the capacitor and the distance between the first and second pluralities of projections being established such that the capacitor is secured in place by the pressure applied by said first and second pluralities of projections.

2. A capacitor assembly as in claim 1 where the first plurality of projections includes a projection disposed at the center of the closed end.

3. A capacitor assembly as in claim 2 where the capacitor has a hollow central core with a predetermined diameter, and where the projection disposed at the center of the closed end of the container has a maximum diameter which is at least as large as the diameter of said hollow central core.

4. A capacitor assembly as in claim 3 where the first plurality of projections includes at least one circular arrangement of said projections surrounding the projection disposed at the center of the closed end of the container.

5. A capacitor assembly as in claim 1 where the projections distributed over the surface of the closed end are spherical.

6. A capacitor assembly as in claim 1 where the projections in the at least one circular arrangement are elongated and extend transversely of a circle on which said projections are arranged.

7. A capacitor assembly as in claim 1 where the predefined pattern locates the first plurality projections such that at least three of said projections will press into the first end of the capacitor at the maximum possible displacement of said first end from a centered position in the container.

8. A capacitor assembly as in claim 1 where the capacitor layers are wound in a spiral configuration.

* * * * *